United States Patent
Johnsen et al.

(10) Patent No.: US 8,713,649 B2
(45) Date of Patent: Apr. 29, 2014

(54) SYSTEM AND METHOD FOR PROVIDING RESTRICTIONS ON THE LOCATION OF PEER SUBNET MANAGER (SM) INSTANCES IN AN INFINIBAND (IB) NETWORK

(75) Inventors: Bjorn-Dag Johnsen, Oslo (NO); Line Holen, Fetsund (NO); Dag Georg Moxnes, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/488,161

(22) Filed: Jun. 4, 2012

(65) Prior Publication Data
US 2012/0311682 A1     Dec. 6, 2012

Related U.S. Application Data

(60) Provisional application No. 61/493,330, filed on Jun. 3, 2011, provisional application No. 61/645,517, filed on May 10, 2012.

(51) Int. Cl.
    *G06F 7/04* (2006.01)
(52) U.S. Cl.
    USPC ........ 726/5; 726/2; 726/15; 726/27; 713/151; 713/189; 713/193; 370/428; 709/223
(58) Field of Classification Search
    USPC ................ 726/2–5; 713/600, 168, 187, 193; 370/428
    See application file for complete search history.

(56) References Cited

U.S. PATENT DOCUMENTS

| | | |
|---|---|---|
| 5,805,805 A | 9/1998 | Civanlar et al. |
| 6,748,429 B1 | 6/2004 | Talluri et al. |
| 6,941,350 B1 | 9/2005 | Frazier et al. |
| 6,978,300 B1 | 12/2005 | Beukema et al. |
| 6,981,025 B1 | 12/2005 | Frazier et al. |
| 6,985,956 B2 | 1/2006 | Luke et al. |
| 7,069,468 B1 | 6/2006 | Olson |
| 7,185,025 B2 | 2/2007 | Rosenstock et al. |
| 7,200,704 B2 | 4/2007 | Njoku et al. |
| 7,216,163 B2 | 5/2007 | Sinn |

(Continued)

FOREIGN PATENT DOCUMENTS

| | | |
|---|---|---|
| EP | 2 051 436 A1 | 4/2009 |
| EP | 2160068 A1 | 3/2010 |
| WO | 01/90838 A2 | 11/2001 |
| WO | 2012037518 | 3/2012 |

OTHER PUBLICATIONS

Manhee Lee, Security Enhancement in Infiniband Architecture, Apr. 2005, IEEE, vol. 19, pp. 1-18.*

(Continued)

*Primary Examiner* — Cordelia Zecher
*Assistant Examiner* — Viral Lakhia
(74) *Attorney, Agent, or Firm* — Meyer IP Law Group

(57) ABSTRACT

A system and method can provide subnet manager (SM) restrictions in an InfiniBand (IB) network. A first SM in a subnet in the IB network operates to determine whether a second SM associated with a remote port is trustworthy. Furthermore, the first SM is allowed to send at least one of a request and a response that contains a management key to the second SM, if the first SM determines that the second SM is trustworthy. Additionally, the first SM is prevented from attempting to initiate communication with the second SM, if otherwise.

19 Claims, 3 Drawing Sheets

(56) References Cited

U.S. PATENT DOCUMENTS

| | | | |
|---|---|---|---|
| 7,231,518 B1 | 6/2007 | Bakke | |
| 7,290,277 B1 | 10/2007 | Chou et al. | |
| 7,356,841 B2 | 4/2008 | Wilson et al. | |
| 7,409,432 B1 | 8/2008 | Recio et al. | |
| 7,437,447 B2* | 10/2008 | Brey et al. | 709/223 |
| 7,493,409 B2* | 2/2009 | Craddock et al. | 709/238 |
| 7,500,236 B2 | 3/2009 | Janzen | |
| 7,633,955 B1 | 12/2009 | Saraiya et al. | |
| 7,685,385 B1 | 3/2010 | Choudhary et al. | |
| 7,860,961 B1 | 12/2010 | Finkelstein et al. | |
| 8,327,437 B2* | 12/2012 | McAlister | 726/15 |
| 8,331,381 B2* | 12/2012 | Brown et al. | 370/401 |
| 8,549,281 B2* | 10/2013 | Samovskiy et al. | 713/151 |
| 2002/0059597 A1* | 5/2002 | Kikinis et al. | 725/39 |
| 2002/0120720 A1 | 8/2002 | Moir | |
| 2003/0009487 A1 | 1/2003 | Prabakaran et al. | |
| 2003/0093509 A1 | 5/2003 | Li et al. | |
| 2003/0105903 A1 | 6/2003 | Garnett et al. | |
| 2003/0120852 A1 | 6/2003 | McConnell et al. | |
| 2004/0249928 A1 | 12/2004 | Jacobs et al. | |
| 2005/0071709 A1 | 3/2005 | Rosenstock et al. | |
| 2005/0091396 A1 | 4/2005 | Nilakantan et al. | |
| 2005/0105554 A1 | 5/2005 | Kagan et al. | |
| 2005/0182853 A1 | 8/2005 | Lewites et al. | |
| 2005/0198250 A1* | 9/2005 | Wang | 709/223 |
| 2005/0273641 A1* | 12/2005 | Sandven et al. | 713/600 |
| 2006/0079278 A1 | 4/2006 | Ferguson et al. | |
| 2006/0195560 A1 | 8/2006 | Newport | |
| 2008/0031266 A1 | 2/2008 | Tallet et al. | |
| 2008/0183853 A1 | 7/2008 | Manion et al. | |
| 2008/0250125 A1* | 10/2008 | Brey et al. | 709/220 |
| 2009/0049164 A1 | 2/2009 | Mizuno | |
| 2010/0138532 A1 | 6/2010 | Glaeser et al. | |
| 2011/0072206 A1 | 3/2011 | Ross et al. | |

OTHER PUBLICATIONS

International Search Report dated Sep. 23, 2013 for Application No. PCT/US2013/040639, 10 pages.

InfiniBand$^{SM}$ Trade Association, InfiniBand™ Architecture Specification, vol. 1, Release 1.2.1, Nov. 2007, pp. 1-1727.

International Search Report dated Sep. 26, 2013 for Application No. PCT/US2013/040656, 10 pages.

\* cited by examiner

SYSTEM AND METHOD FOR PROVIDING RESTRICTIONS ON THE LOCATION OF PEER SUBNET MANAGER (SM) INSTANCES IN AN INFINIBAND (IB) NETWORK

CLAIM OF PRIORITY

This application claims the benefit of priority on U.S. Provisional Patent Application No. 61/493,330, entitled "STATEFUL SUBNET MANAGER FAILOVER IN A MIDDLEWARE MACHINE ENVIRONMENT" filed Jun. 3, 2011, and U.S. Provisional Patent Application No. 61/645,517, entitled "SYSTEM AND METHOD FOR PROVIDING SECRET MANAGEMENT KEY IN A MIDDLEWARE MACHINE ENVIRONMENT" filed May 10, 2012, which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent applications, which is hereby incorporated by reference in its entirety:

U.S. patent application Ser. No. 13/487,973, entitled "SYSTEM AND METHOD FOR PROVIDING SECURE SUBNET MANAGEMENT AGENT (SMA) IN AN INFINIBAND (IB) NETWORK", by inventors Bjørn Dag Johnsen, Ola Tørudbakken and David Brean, filed Jun. 4, 2012.

U.S. patent application Ser. No. 13/488,040, entitled "SYSTEM AND METHOD FOR AUTHENTICATING IDENTITY OF DISCOVERED COMPONENT IN AN INFINIBAND (IB) NETWORK", by inventors Bjørn Dag Johnsen, Predrag Hodoba and Ola Tørudbakken, filed Jun. 4, 2012.

U.S. patent application Ser. No. 13/488,192, entitled "SYSTEM AND METHOD FOR SUPPORTING SUBNET MANAGER (SM) LEVEL ROBUST HANDLING OF UNKNOWN MANAGEMENT KEY IN AN INFINIBAND (IB) NETWORK," by inventors Bjørn Dag Johnsen, Line Holen and Dag Georg Moxnes filed Jun. 4, 2012.

FIELD OF INVENTION

The present invention is generally related to computer systems, and is particularly related to supporting an InfiniBand (IB) network.

BACKGROUND

The interconnection network plays a beneficial role in the next generation of super computers, clusters, and data centers. High performance network technology, such as the InfiniBand (IB) technology, is replacing proprietary or low-performance solutions in the high performance computing domain, where high bandwidth and low latency are the key requirements. For example, IB installations are used in supercomputers such as Los Alamos National Laboratory's Roadrunner, Texas Advanced Computing Center's Ranger, and Forschungszentrum Juelich's JuRoPa.

IB was first standardized in October 2000 as a merge of two older technologies called Future I/O and Next Generation I/O. Due to its low latency, high bandwidth, and efficient utilization of host-side processing resources, it has been gaining acceptance within the High Performance Computing (HPC) community as a solution to build large and scalable computer clusters. The de facto system software for IB is OpenFabrics Enterprise Distribution (OFED), which is developed by dedicated professionals and maintained by the OpenFabrics Alliance. OFED is open source and is available for both GNU/Linux and Microsoft Windows.

SUMMARY

Described herein is a system and method that can provide subnet manager (SM) restrictions in an InfiniBand (IB) network. A first SM in a subnet in the IB network operates to determine whether a second SM associated with a remote port is trustworthy. Furthermore, the first SM is allowed to send at least one of a request and a response that contains a management key to the second SM, if the first SM determines that the second SM is trustworthy. Additionally, the first SM is prevented from attempting to initiate communication with the second SM, if otherwise.

DETAILED DESCRIPTION

Described herein is a system and method that can provide restrictions on the location of peer (coorperating) subnet managers (SMs) in an interconnected network, such as an InfiniBand (IB) network.

Figure 1:
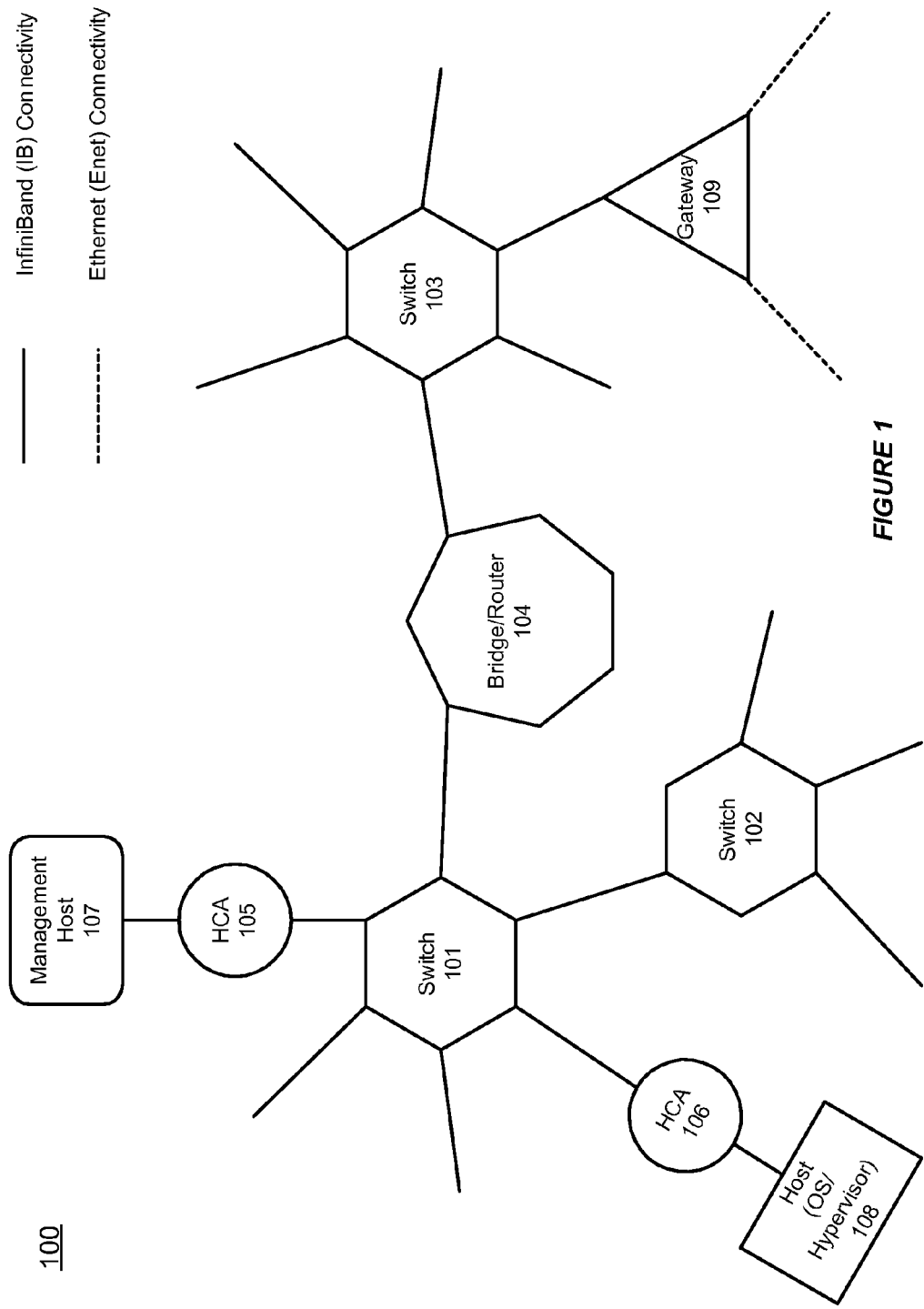
FIG. 1 shows an illustration of a fabric model in a middleware environment in accordance with an embodiment of the invention.

FIG. 1 shows an illustration of a fabric model in a middleware environment in accordance with an embodiment of the invention. As shown in FIG. 1, an interconnected network, or a fabric 100, can include switches 101-103, bridges and routers 104, host channel adapters (HCAs) 105-106 and designated management hosts 107. Additionally, the fabric can include, or be connected to, one or more hosts 108 that are not designated management hosts.

The designated management hosts 107 can be installed with HCAs 105-106, a network software stack and relevant management software in order to perform network management tasks. Furthermore, firmware and management software can be deployed on the switches 101-103, and the bridges and routers 104 to direct traffic flow in the fabric. Here, the host HCA drivers, OS and Hypervisors on hosts 108 that are not designated management hosts may be considered outside the scope of the fabric from a management perspective.

The fabric 100 can be in a single media type, e.g. an IB only fabric, and be fully connected. The physical connectivity in the fabric ensures in-band connectivity between any fabric components in the non-degraded scenarios. Alternatively, the fabric can be configured to include Ethernet (Enet) connectivity outside gateway (GW) external ports on a gateway 109. Additionally, it is also possible to have independent fabrics operating in parallel as part of a larger system. For example, the different fabrics can be only indirectly connected via different HCAs or HCA ports.

InfiniBand (IB) Architecture

IB architecture is a serial point-to-point technology. Each of the IB networks, or subnets, can include a set of hosts interconnected using switches and point-to-point links. A single subnet can be scalable to more than ten-thousand nodes and two or more subnets can be interconnected using an IB router. The hosts and switches within a subnet are addressed using local identifiers (LIDs), e.g. a single subnet may be limited to 49151 unicast addresses.

An IB subnet can employ at least one subnet manager (SM) which is responsible for initializing and starting up the subnet including the configuration of all the IB ports residing on switches, routers and host channel adapters (HCAs) in the subset. The SM's responsibility also includes routing table calculation and deployment. Routing of the network aims at obtaining full connectivity, deadlock freedom, and load balancing between all source and destination pairs. Routing tables can be calculated at network initialization time and this process can be repeated whenever the topology changes in order to update the routing tables and ensure optimal performance.

At the time of initialization, the SM starts in the discovering phase where the SM does a sweep of the network in order to discover all switches and hosts. During the discovering phase, the SM may also discover any other SMs present and negotiate who should be the master SM. When the discovering phase is completed, the SM can enter a master phase. In the master phase, the SM proceeds with LID assignment, switch configuration, routing table calculations and deployment, and port configuration. At this point, the subnet is up and ready to use.

After the subnet is configured, the SM can monitor the network for changes (e.g. a link goes down, a device is added, or a link is removed). If a change is detected during the monitoring process, a message (e.g. a trap) can be forwarded to the SM and the SM can reconfigure the network. Part of the reconfiguration process, or a heavy sweep process, is the rerouting of the network which can be performed in order to guarantee full connectivity, deadlock freedom, and proper load balancing between all source and destination pairs.

The HCAs in an IB network can communicate with each other using queue pairs (QPs). A QP is created during the communication setup, and a set of initial attributes such as QP number, HCA port, destination LID, queue sizes, and transport service are supplied. On the other hand, the QP associated with the HCAs in a communication is destroyed when the communication is over. An HCA can handle many QPs, each QP consists of a pair of queues, a send queue (SQ) and a receive queue (RQ). There is one such pair present at each end-node that is participating in the communication. The send queue holds work requests to be transferred to the remote node, while the receive queue holds information on what to do with the data received from the remote node. In addition to the QPs, each HCA can have one or more completion queues (CQs) that are associated with a set of send and receive queues. The CQ holds completion notifications for the work requests posted to the send and receive queue.

The IB architecture is a flexible architecture. Configuring and maintaining an IB subnet can be carried out via special in-band subnet management packets (SMPs). The functionalities of a SM can, in principle, be implemented from any node in the IB subnet. Each end-port in the IB subnet can have an associated subnet management agent (SMA) that is responsible for handling SMP based request packets that are directed to it. In the IB architecture, a same port can represent a SM instance or other software component that uses SMP based communication. Thus, only a well defined sub-set of SMP operations can be handled by the SMA.

SMPs use dedicated packet buffer resources in the fabric, e.g. a special virtual lane (VL15) that is not flow-controlled (i.e. SMP packets may be dropped in the case of buffer overflow. Also, SMPs can use either the routing that the SM sets up based on end-port local Identifiers (LIDs), or SMPs can use direct routes where the route is fully defined by the sender and embedded in the packet. Using direct routes, the packet's path goes through the fabric in terms of an ordered sequence of port numbers on HCAs and switches.

The SM can monitor the network for changes using SMAs that are presented in every switch and/or every HCA. The SMAs communicate changes, such as new connections, disconnections, and port state change, to the SM using traps and notices. A trap is a message sent to alert end-nodes about a certain event. A trap can contain a notice attribute with the details describing the event. Different traps can be defined for different events. In order to reduce the unnecessary distribution of traps, IB applies an event forwarding mechanism where end-nodes are required to explicitly subscribe to the traps they want to be informed about.

The subnet administrator (SA) is a subnet database associated with the master SM to store different information about a subnet. The communication with the SA can help the end-node to establish a QP by sending a general service management datagram (MAD) through a designated QP, .e.g. QP1. Both sender and receiver require information such as source/destination LIDs, service level (SL), maximum transmission unit (MTU), etc. to establish communication via a QP. This information can be retrieved from a data structure known as a path record that is provided by the SA. In order to obtain a path record, the end-node can perform a path record query to the SA, e.g. using the SubnAdmGet/SubnAdmGetable operation. Then, the SA can return the requested path records to the end-node.

The IB architecture provides partitions as a way to define which IB end-ports should be allowed to communicate with other IB end-ports. Partitioning is defined for all non-SMP packets on the IB fabric. The use of partitions other than the default partition is optional. The partition of a packet can be defined by a 16 bit P_Key that consists of a 15 bit partition number and a single bit member type (full or limited).

The partition membership of a host port, or an HCA port, can be based on the premise that the SM sets up the P_Key table of the port with P_Key values that corresponds to the current partition membership policy for that host. In order to compensate for the possibility that the host may not be fully trusted, the IB architecture also defines that switch ports can optionally be set up to do partition enforcement. Hence, the P_Key tables of switch ports that connect to host ports can then be set up to reflect the same partitions as the host port is supposed to be a member of (i.e. in essence equivalent to switch enforced VLAN control in Ethernet LANs).

Since the IB architecture allows full in-band configuration and maintenance of an IB subnet via SMPs, the SMPs themselves are not subject to any partition membership restrictions. Thus, in order to avoid the possibility that any rough or compromised node on the IB fabric is able to define an arbitrary fabric configuration (including partition membership), other protection mechanisms are needed.

M_Keys can be used as the basic protection/security mechanism in the IB architecture for SMP access. An M_Key is a 64 bit value that can be associated individually with each individual node in the IB subnet, and where incoming SMP operations may be accepted or rejected by the target node depending on whether the SMP includes the correct M_Key value (i.e. unlike P_Keys, the ability to specify the correct M_Key value—like a password—represents the access control).

By using an out-of-band method for defining M_Keys associated with switches, it is possible to ensure that no host node is able to set up any switch configuration, including partition membership for the local switch port. Thus, an M_Key value is defined when the switch IB links becomes operational. Hence, as long as the M_Key value is not compromised or "guessed" and the switch out-of-band access is secure and restricted to authorized fabric administrators, the fabric is secure.

Furthermore, the M_Key enforcement policy can be set up to allow read-only SMP access for all local state information except the current M_Key value. Thus, it is possible to protect the switch based fabric from un-authorized (re-)configuration, and still allow host based tools to perform discovery and diagnostic operations.

The flexibility provided by the IB architecture allows the administrators of IB fabrics/subnets, e.g. HPC clusters, to decide whether to use embedded SM instances on one or more switches in the fabric and/or set up one or more hosts on the IB fabric to perform the SM function. Also, since the wire protocol defined by the SMPs used by the SMs is available through APIs, different tools and commands can be implemented based on use of such SMPs for discovery, diagnostics and control independently of any current Subnet Manager operation.

From a security perspective, the flexibility of IB architecture indicates that there is no fundamental difference between root access to the various hosts connected to the IB fabric and the root access allowing access to the IB fabric configuration. This is fine for systems that are physically secure and stable. However, this can be problematic for system configurations where different hosts on the IB fabric are controlled by different system administrators, and where such hosts should be logically isolated from each other on the IB fabric.

The Fabric Trust Model

In accordance with an embodiment of the invention, the IB fabric can make sure that a SM does not attempt to initiate any communication with remote SM instances unless the location of the remote SM is authenticated by representing a valid SM location (such as on a switch or a designated management host HCA). Furthermore, the IB fabric can make sure that the M_Key associated with the remote port is known and consistent with the M_Key of the local SM.

Figure 2:
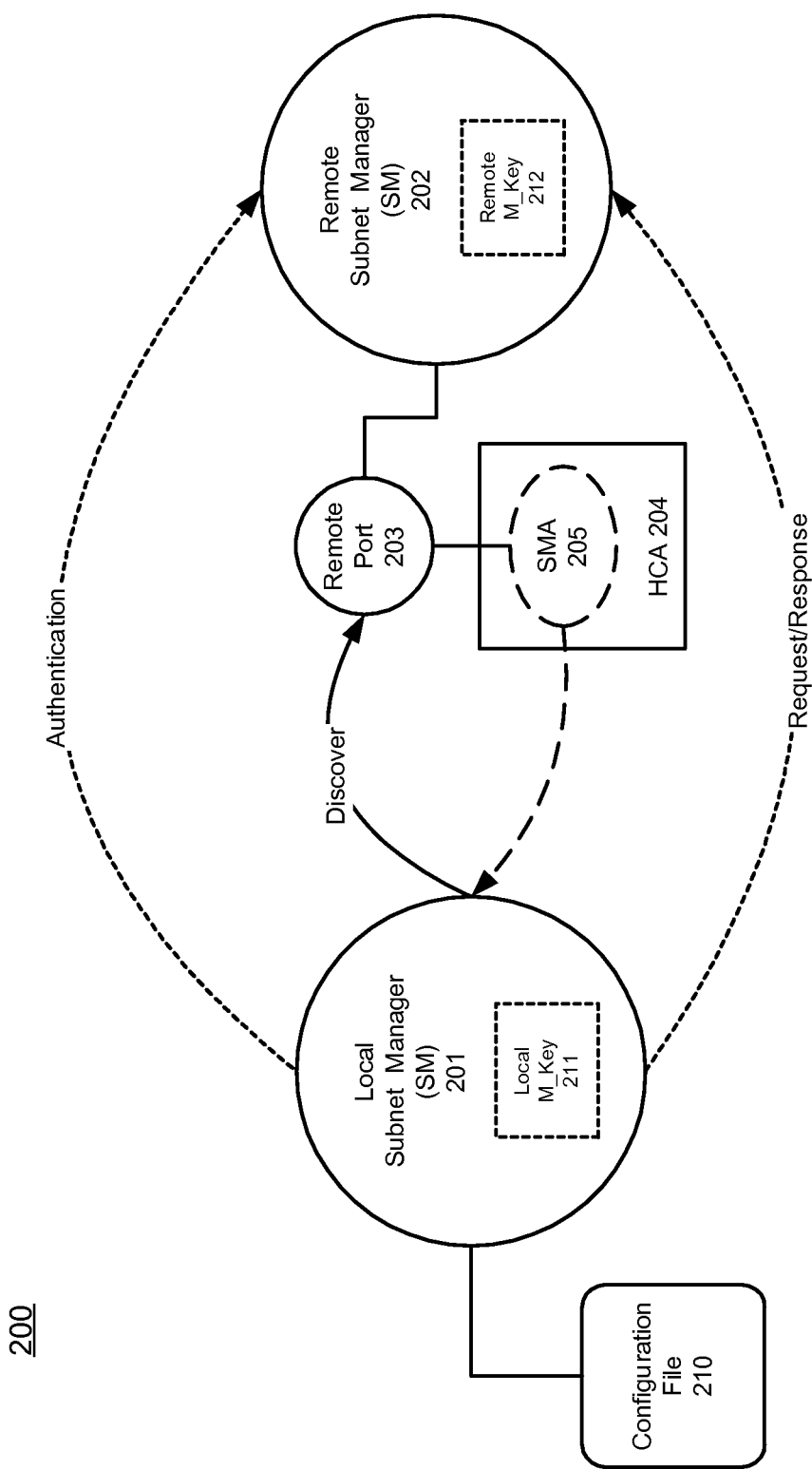
FIG. 2 shows an illustration of providing SM restrictions in an IB network in accordance with an embodiment of the invention.

FIG. 2 shows an illustration of providing SM restrictions in an IB network in accordance with an embodiment of the invention. As shown in FIG. 2, the fabric 200 includes a local SM 201, which includes a local management key, e.g. a local M_Key 211. The local SM 201 can detect a remote port 203 that is associated with a remote SM 202, which includes a remote management key, e.g. a remote M_Key 212.

The SM 201 can determine the trustfulness of the discovered port 203 (or an SMA 205) before initiating any communication with the remote SM instance 202, e.g. trying to read the remote M_Key 212 using a secret local M_Key value 211 in a request.

The SM 201 can use a configurable trust model to determine the trustfulness of the remote peer SM 202, e.g. via a configuration file 210. The configuration file 210 can have a format that corresponds to the partition configuration file for the subnet 200. Also, the configuration file 210 can use key words such as ALL, ALL_CAS, ALL_SWITCHES etc.

The configuration file 210 allows for a default configuration, in which case all switches in the subnet 200 are trustworthy and all HCAs 204 in the subnet 200 are not trustworthy. Additionally, the configuration file 210 can overrule the default configuration via specifying whether an individual component is trustworthy, e.g. via listing the globally unique identifier (GUID) for the specific component. Also, the SM 201 and the configuration file 210 can support specifying both (1) if a port 203 (or a port type) has a trusted SMA, and (2) to what extent the SMA can be trusted to host a valid SM instance.

Based on this configurable trust model, the SM 201 can be prevented from sending any SM-SM request/response that contains either a management key, such as a secret trusted M_Key or secret SM_Key, to a peer SM 202, unless the SM 201 knows that the port 203 is trusted to host a SM based on the discovery of the port, or based on having already received a request that contains a valid (known) secret SM_Key value if the remote port 203 is not yet discovered/known.

Furthermore, the SM 201 can use SMP based authentication protocols to determine the trustfulness of a remote peer SM. Such SMP based authentication protocols can verify the identity and trustfulness of a remote peer SM 202, e.g. via private/public key based schemes, without having to rely on whether discovered SMA level information is correct or to rely on whether either party provides any secret value as an initial credential.

Additionally, the SM 201 can use the information provided by the SMAs to determine the trustfulness of a remote peer SM 202, e.g. when the SMA is part of a secure HCA firmware on the HCA and/or the switches are all fully controlled by the designated software and firmware. On the other hand, if the HCA does not implement a secure HCA firmware, then an additional mechanism, such as the SMP based authentication protocols, can be used to verify the trustfulness of the information provided by the SMAs.

Thus, by using the secure HCA firmware and/or the SMP based authentication protocols, the system can avoid being compromised in various scenarios, such as (1) when the current M_Key is retrieved from the local HCA driver and then used to maliciously update the state of the fabric, including the use of unknown secret M_Key values, and (2) a more elaborate scheme that involves installing a hacked HCA driver/SMA on the host that is capable of impersonating a switch (node type) or other node instance (GUID).

In order to ensure that the SM mastership may not be handed over to an un-trusted SM, the trusted SMs may not engage in any master-election with SM instances that are not trusted. Instead, the trusted SM can continue its discovery and become master in the part of the subnet it can manage.

Also, since the SM with a stale M_Key configuration is not able to manage nodes that already have been set up with the most recent M_Key value, the SM mastership will not be handed over to any trusted SM that does not have the most recent M_Key configuration. Thus, any subnet with multiple SMs that do not all have the same current M_Key configuration can eventually be conquered by the SM that has the most recent configuration (i.e. assuming that all other SMs with stale configuration have a current value that is included in the list of known values for the SM with the most recent configuration).

In accordance with an embodiment of the invention, two or more SM instances 201 and 202 can concurrently perform discovery of the IB subnet 200, which includes the discovery of other SM instances. For example, the SM 201 may receive SM-SM negotiation requests from another SM 202 that resides behind an IB port 203 that has not yet been discovered by the SM 201. Hence, the SM 201 may not be able to associate any trust information with the SM 202 based on the type and identity of the port 203, from which the SM 202 operates at this point in time.

On the other hand, if the SM 202 is, in fact, a trusted SM that has already established the trustfulness with the SM 201 and has also confirmed the validity of the location of the SM 201, then the SM 202 can include current secret management key values 212 in the request to the SM 201. The SM 201 can then verify that the SM 201 is trusted based on the received secret management key values 212 without having exposed any of its local secret key information 211. The SM 201 can then respond to the SM 202 with subnet management messages, e.g. SMPs containing secret management key values 211, in order to confirm that it is considering the SM 202 as a trusted SM.

The above scheme can work without any dependency on the use of public/private key based authentication. Furthermore, if public/private key based authentication is used, then such schemes can be used to establish mutual trustfulness prior to both SMs 201 and 202 having discovered the IB port that the other SM is operating from.

Figure 3:
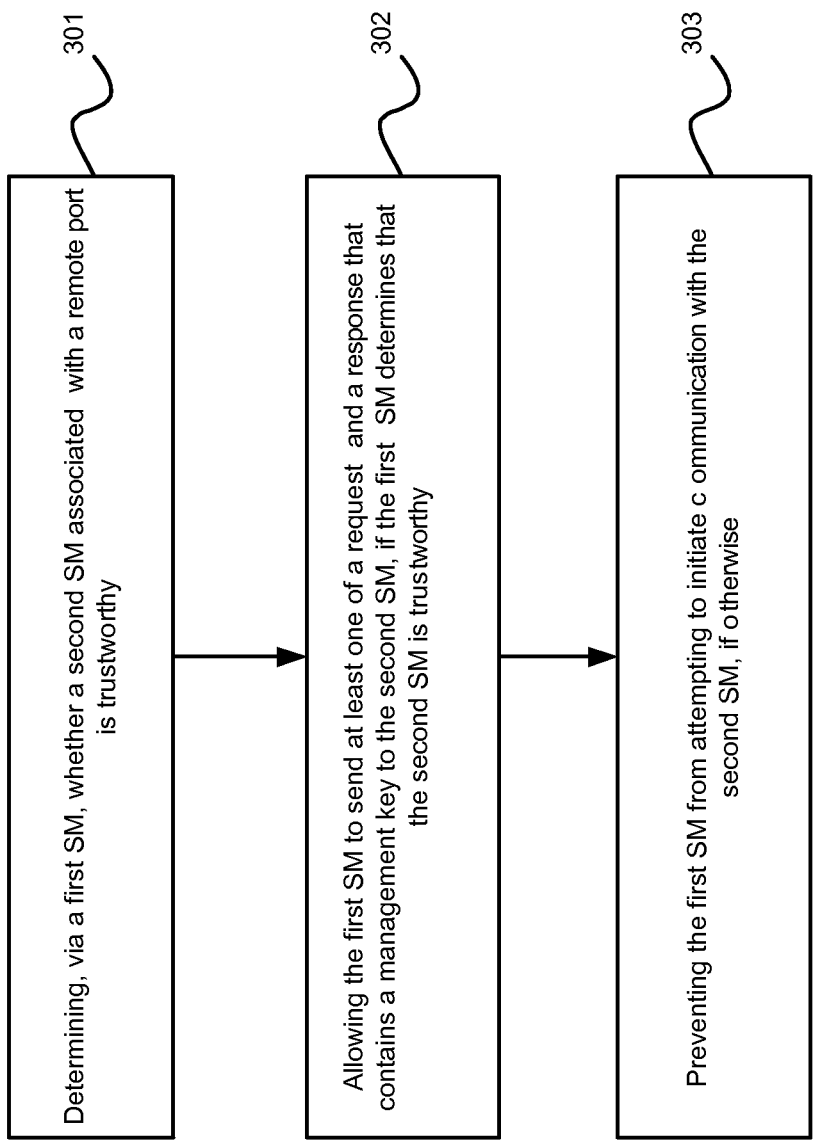
FIG. 3 illustrates an exemplary flow chart for providing SM restrictions in an IB network in accordance with an embodiment of the invention.

FIG. 3 illustrates an exemplary flow chart for providing SM restriction in an IB network in accordance with an embodiment of the invention. As shown in FIG. 3, at step 301, a first SM can determine whether a second SM associated with a remote port is trustworthy. Then, at step 302, the first SM can send at least one of a request and a response that contains a management key to the second SM, if the first SM determines that the second SM is trustworthy. Otherwise, at step 303, the first SM is prevented from attempting to initiate communication with the second SM, if otherwise.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for providing subnet manager (SM) restriction in an InfiniBand (IB) network, comprising:
   detecting, via a local SM that runs on one or more microprocessors, a remote port that is associated with a remote SM, wherein the local SM is associated with a local management key and the remote SM is associated with a remote management key;
   determining, via the local SM, whether the remote SM associated with the remote port is trustworthy based on at least one of:
     known secret management key values in an incoming SM-SM request received from the remote SM before the local SM discovers type, location and trustfulness of an port that the remote SM operates from, and
     a public/private key based authentication procedure initiated by either the remote SM or the local SM before the local SM discovers type, location and trustfulness of an port that the remote SM operates from; and
   allowing the local SM to send at least one of a request and a response that contains a secret management key to the remote SM, if the local SM determines that the remote SM is trustworthy, and preventing the local SM from initiating a communication with the remote SM using a secret management key, if otherwise.

2. The method according to claim 1, further comprising:
   using, via the local SM, a configurable trust model to determine whether the remote SM is trustworthy.

3. The method according to claim 2, further comprising:
   allowing a configuration file to be used in the configurable trust model, wherein the configuration file corresponds to a partition configuration file.

4. The method according to claim 2, further comprising:
   specifying a default configuration that all switches in the IB network are trustworthy and all host channel adaptors (HCAs) associated with a host are not trustworthy.

5. The method according to claim 4, further comprising:
   overruling the default configuration by specifying whether an individual component is trustworthy.

6. The method according to claim 1, further comprising:
   using subnet management packet (SMP) based authentication protocols to verify identity and trustfulness of the second SM.

7. The method according to claim 6, further comprising:
   the SMP based authentication protocols uses private/public key based schemes.

8. The method according to claim 1, further comprising:
   using discovered SMA level information to verify identity and trustfulness of the remote SM, and
   trusting information provided by a secure HCA firmware that is associated with the remote SM to be correct.

9. The method according to claim 1, further comprising:
   sending one or more SM-SM negotiation requests to a remote SM to perform master-election; and
   allowing a SM with a most recent configuration to conquer a subnet with multiple SMs.

10. A system for providing subnet manager (SM) restriction in an InfiniBand (IB) network, comprising:
    one or more microprocessors;
    a local SM in a subnet that runs on the one or more microprocessors, wherein the local SM operates to
      detect, via a local SM, a remote port that is associated with a remote SM, wherein the local SM is associated with a local management key and the remote SM is associated with a remote management key;

determine whether the remote SM associated with a remote port is trustworthy based on at least one of
- known secret management key values in an incoming SM-SM request received from the remote SM before the local SM discovers type, location and trustfulness of an port that the remote SM operates from, and
- a public/private key based authentication procedure initiated by either the remote SM or the local SM before the local SM discovers type, location and trustfulness of a port that the remote SM operates from;

allow the local SM to send at least one of a request and a response that contains a secret management key to the remote SM, if the local SM determines that the remote SM is trustworthy, and prevent the local SM from initiating a communication with the remote SM using a secret management key, if otherwise.

11. The system according to claim 10, wherein:
the local SM can use a configurable trust model to determine whether the remote SM is trustworthy.

12. The system according to claim 11, further comprising:
a configuration file to be used in the configurable trust model, wherein the configuration file corresponds to a partition configuration file.

13. The system according to claim 11, wherein:
the configurable trust model allows a default configuration, which specifies that all switches in the IB network are trustworthy and all host channel adaptors (HCAs) associated with a host are not trustworthy.

14. The system according to claim 13, wherein:
the configurable trust model allows the default configuration to be overruled by specifying whether an individual component is trustworthy.

15. The system according to claim 10, wherein:
the local SM can use subnet management packet (SMP) based authentication protocols that can verify identity and trustfulness of the remote SM.

16. The system according to claim 15, wherein:
the SMP based authentication protocols uses private/public key based schemes.

17. The system according to claim 10, wherein:
the local SM is allowed to trust discovered SMA level information provided by a secure HCA firmware that is associated with the remote SM, and
the local SM further operates to use the discovered SMA level information to verify identity and trustfulness of the remote SM.

18. A non-transitory machine readable storage medium having instructions stored thereon that when executed cause a system to perform the steps of:
detecting, via a local SM in an InfiniBand (IB) network, a remote port that is associated with a remote SM in the IB network, wherein the local SM is associated with a local management key and the remote SM is associated with a remote management key;
determining, via the local SM, whether the remote SM associated with the remote port is trustworthy based on at least one of
- known secret management key values in an incoming SM-SM request received from the remote SM before the local SM discovers type, location and trustfulness of an port that the remote SM operates from, and
- a public/private key based authentication procedure initiated by either the remote SM or the local SM before the local SM discovers type, location and trustfulness of an port that the remote SM operates from; and allowing the local SM to send at least one of a request and a response that contains a secret management key to the remote SM, if the local SM determines that the remote SM is trustworthy, and preventing the local SM from initiating a communication with the remote SM using a secret management key, if otherwise.

19. The system according to claim 10, wherein:
the local SM operates to send one or more SM-SM negotiation requests to a remote SM to perform master-election, and allows a SM with a most recent configuration to conquer a subnet with multiple SMs.

* * * * *

UNITED STATES PATENT AND TRADEMARK OFFICE
CERTIFICATE OF CORRECTION

Page 1 of 1

PATENT NO. : 8,713,649 B2
APPLICATION NO. : 13/488161
DATED : April 29, 2014
INVENTOR(S) : Johnsen et al.

It is certified that error appears in the above-identified patent and that said Letters Patent is hereby corrected as shown below:

In the Drawings

On sheet 3 of 3, in figure 3, under box number 303, line 1, delete "c ommunication" and insert -- communication --, therefor.

On sheet 3 of 3, in figure 3, under box number 303, line 2, delete "o therwise" and insert -- otherwise --, therefor.

In the Specification

In column 2, line 43, delete "(coorperating)" and insert -- (cooperating) --, therefor.

Signed and Sealed this
Fourteenth Day of October, 2014

Michelle K. Lee
*Deputy Director of the United States Patent and Trademark Office*